Nov. 14, 1950     R. L. ROBERTSON     2,529,742
GARMENT HANGER
Filed Nov. 13, 1945
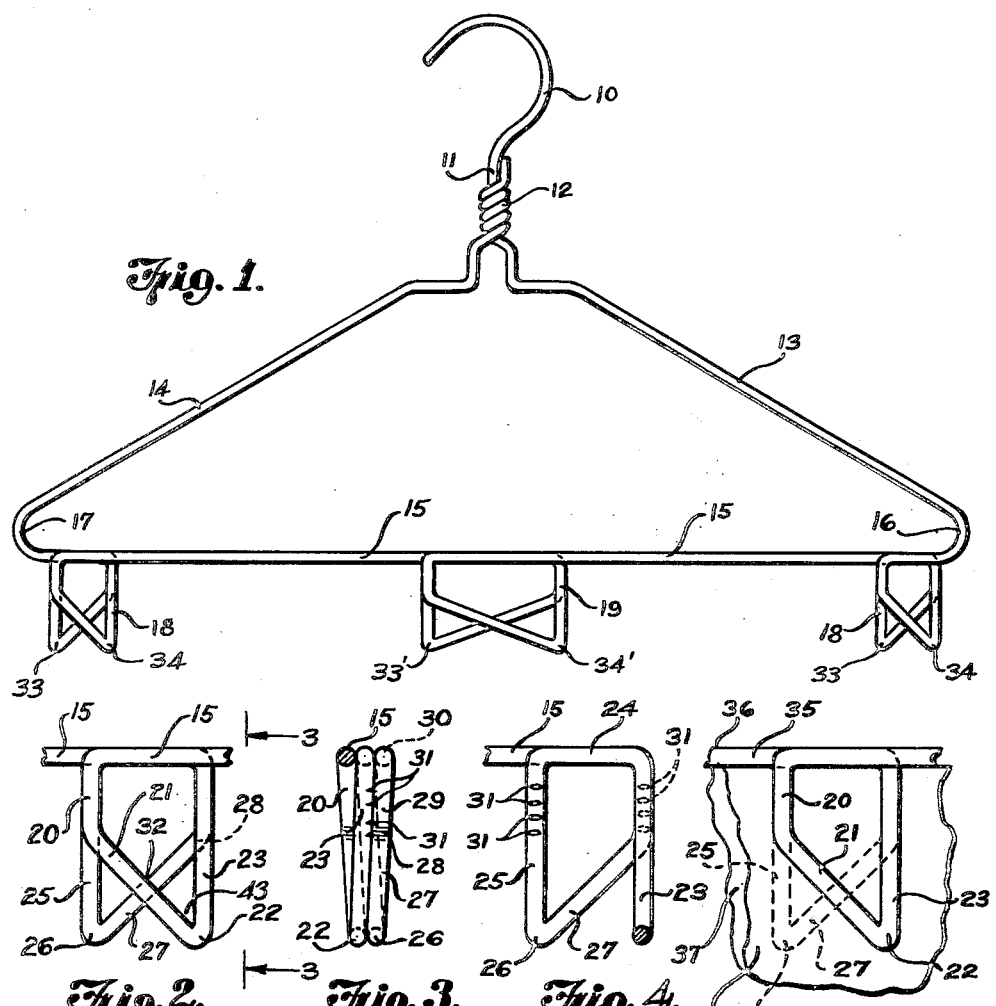
INVENTOR
ROBERT L. ROBERTSON
BY Alfred R. Fuchs
ATTORNEY Patented Nov. 14, 1950

2,529,742

UNITED STATES PATENT OFFICE 2,529,742

GARMENT HANGER

Robert L. Robertson, Kansas City, Mo.

Application November 13, 1945, Serial No. 628,052

7 Claims. (Cl. 223—91)

My invention relates to garment hangers, and more particularly to a garment hanger provided with integral skirt or trouser holding clips.

The ordinary coat hanger made of wire will not satisfactorily hold a garment such as a lady's skirt, or slacks, or men's trousers when the coat hanger is used as a carrying means, as is common in the case of dry cleaning establishments in the delivery of their work, without pinning the garment to the cross bar of the hanger. This is undesirable because the pinning frequently damages the article, and if it does not damage it, it at least causes undesirable creases or marks thereon. While there are garment hangers made that have spring clips thereon that are pivotally mounted, these being made in the form of the ordinary wooden spring clothes pin, such hangers are also unsatisfactory because the clips will not stay in a fixed position, and in addition to that with the clips in place the cross bar of the hanger can not be used in the usual manner for hanging a pair of trousers thereover, as is sometimes desired.

It is a particular purpose of my invention to provide a garment hanger which is made in the form of the ordinary garment hanger adapted to receive a coat and a pair of trousers, the coat being hung on the diverging or inclined portions thereof and the trousers across the cross bar, on which clips are provided for holding trousers, skirts, or other garments, that it is desired to hang from the cross bar by one end of the garment, which clips are fixed in position on the cross bar and rigid therewith and depending entirely below the top surface of the cross bar, so as to not interfere in any manner with the use of the cross bar for hanging a pair of trousers or similar garment thereacross.

By provision of such clips which are, preferably, formed integral with the cross bar of the wire material of the cross bar, among the advantages that exist are the fact that the clips will not come out of place and will not tear or destroy a garment as pins or safety pins will, as are used at the present time for this purpose, and if the garment is hung on the hanger and the hanger tips sidewise the garment cannot slip down in one corner of the hanger, as is the case with clips that are not fastened, or with hangers that are not provided with clips, which slipping into one corner will cause undesirable wrinkling of the garment.

It is a further purpose of my invention to provide a hanger of the above mentioned character with clips that are so constructed and arranged that the same will always be ready to receive the garment without the necessity of pulling one wire jaw away from the other, this being accomplished by providing two prongs or jaws of the clip that have tapering end portions that are staggered or out of alignment with each other so that the entrance end of the clip is always, in effect, part way open to receive the garment that is to be inserted between the same, making it possible to insert the edge of the garment with extreme ease.

It is another purpose of my invention to provide a holding clip on a hanger of the above mentioned character, that is so constructed that the holding surfaces exert a pressure exactly surface to surface and not in a side by side relation, whereby a twist on the material will be exerted by the clip, causing a wrinkle or indentation in the material. The holding surfaces of the jaws are in exact alignment with each other so that the same will engage exactly opposite each other, thus avoiding such distortion or wrinkling or unsightly impression on the surface of the garment that is held.

It is a further purpose of my invention to provide in a garment hanger of the above mentioned character end clips and a central clip formed integral with the cross bar, in which the central clip is wider than, preferably, double the width of the end clips, so that two garments can be hung from their end edges in aligned relation to each other from one cross bar without either interfering with the holding of the other thereof.

It is another purpose of my invention to provide in combination with such a hanger means for preventing direct engagement of the jaws of the hanger with the garment to thus prevent any possibility of staining thereof or damage thereof by means of the jaw members. Said means may comprise either a folded piece of fibrous material, such as heavy paper or cardboard having a pair of plies one adjacent each jaw, between the plies of which a garment can be inserted, which fibrous member is detachably mounted between the jaws of the clips, or a member of plastic sheet material can be provided, which has a pair of plies lying side by side inserted between the jaws so that the outer surface of each ply engages a jaw so that a garment can be inserted between the adjacent faces of the plies of said member of plastic sheet material, said member being detachably mounted between the jaws of the clip but being provided with means for preventing accidental disengagement of said plastic sheet material member from the jaws of the clip.

Preferably, my improved garment hanger is provided with jaws having the adjacent faces thereof provided with serrations in the form of indentations or grooves running transversely of the length of the wire of the jaw forming portion.

Other objects and advantages of my invention will appear as the description of the drawings proceeds. I desire to have it understood, however, that I do not intend to limit myself to the particular details shown or described, except as defined in the claims.

In the drawings:

Fig. 1 is a view in elevation of my improved garment hanger.

Fig. 2 is a fragmentary detail view of one of the clips.

Fig. 3 is an end view of the clip, taken on the line 3—3 of Fig. 2, showing the wire of the cross bar in section.

Fig. 4 is an elevational view of one of the clips partly broken away to show the jaw construction thereof.

Fig. 5 is a fragmentary view similar to Fig. 2, showing a detachable sheet material insert between the jaws of the clip.

Fig. 6 is a similar view showing a plastic sheet material insert mounted between the jaws and interlocked with one thereof, and Fig. 7 is a section taken on the line 7—7 of Fig. 6.

Referring in detail to the drawings, my improved garment hanger has a body portion, preferably, made of a single piece of wire having a hook 10 formed at one end thereof, the other end of the wire from which the hanger is made being twisted around the shank portion 11 of the hook, as shown at 12. The hanger may be made of any preferred shape, but is provided with inclined side portions 13 and 14 and a horizontal or transverse bar portion 15 joined by means of curved portions 16 and 17 with the inclined side portions forming a generally triangular body portion for the hanger. The side clips 18 and the central clip 19 are, preferably, formed integral with the transverse bar portion 15, and the central clip 19 is made considerably wider than the end clips 18 so that if desired two separate garments can be secured in depending relation from the cross bar 15 by means of the clips, one by the one clip 18 and the clip 19, and the other by the other clip 18 and the clip 19.

Each of the clips, no matter what the size thereof may be, are formed in the same manner. The hanger member is, preferably, made of wire of suitable gauge and resiliency and the horizontally extending or transversely extending bar portion 15 is made of such wire with the clip members depending entirely below the top edge thereof and rigid therewith. In forming one of said clip members from the wire from which the bar-like member 15 is made said wire is first bent downwardly, as indicated at 20, and then at an oblique angle, as indicated at 21, the angle at which the portion 21 extends to the portion 20 being an obtuse angle, said wire being then bent at 22 at a sharp acute angle so that the portion 23 extends parallel to the portion 20. However, due to the inclined portion 21 being provided, the one jaw of the clip made up of the portions 20, 21 and 23 has the one leg thereof considerably longer than the other, providing a projecting tapering end portion made up of a portion of the obliquely extending member 21, a portion of the member 23 and the bend at 22. At the upper extremity the leg 23 of said jaw is bent at right angles to the said jaw to lie parallel and in exactly aligned relation to the bar 15, said portion being indicated by the numeral 24 in Fig. 4.

The other jaw is formed integral with said first mentioned jaw by bending a leg portion 25 at right angles to the portion 24 so that the same will lie in aligned contacting relation to the portion 20 of the first mentioned jaw, but is made of the same length as the portion 23 of the first mentioned jaw, an acute angled bend 26 being provided to connect the obliquely extending portion 27 with the portion 25, and said jaw is further provided with an obtuse angled bend at 28 to connect a shorter portion 29 extending parallel to and lying in aligned relation in contact with the leg portion 23 of the first mentioned jaw. When the jaws are closed they will assume the position shown in Fig. 3 and will not twist past each other. A horizontally extending portion 30 extends in parallelism to the horizontally extending bar or rod-like member 15 and continues to form the portion of the rod-like member or bar 15 extending on the opposite side of the clip thus formed from that at which the legs 23 and 27 of the clip are located. If desired, the wire member 15 can be offset at opposite sides of each clip so as to throw the clips in exact horizontal alignment with each other and to have the major portions of the bar 15 lying between the clips 18 and 19 in alignment with each other.

Preferably, the engaging faces of the jaw portions 20, 25, 23 and 29 are provided with indentations or cuts or grooves 31 therein providing teeth or serrations, or roughened portions for providing a better gripping action of the jaw portions. The two protruding tapering portions of the clip are out of alignment with each other, the inclined portions 21 and 27 contacting with each other at their intersection 32 and it will be obvious that if a garment is to be inserted between the two jaws formed in the above referred to manner, this can be very easily done by passing the edge of the garment on, respectively, the front and back sides of the jaw portions formed by the members 25, 26 and 27 and the members 21, 22 and 23, as shown in Fig. 2, said projecting tapering jaw portions serving as guiding means for directing the edges of the garment between the holding portions formed by the jaw portions 20 and 25, and 23 and 29 where the same are in engagement with each other, said jaw members having sufficient resiliency that said jaw portions will have a tendency to engage with each other in contacting relation, as shown in Fig. 3, when nothing is inserted between the same. The tapering jaw portions of the jaws 18 are indicated generally by the numerals 33 and 34 in Fig. 1 and the corresponding tapering jaw portions of the wider jaw 19 by the numerals 33' and 34'.

It is very desirable in the case of certain types of garments to not have any direct engagement between the serrations or gripping portions 31 and the material of the garments, and it is also very desirable in the case of most garments made of material of light color to avoid engagement of the metal of the wire of the hanger with the garments. One satisfactory way of accomplishing this is to provide a member 35 made of fibrous material, such as paper, which is folded at the edge 36 so as to provide a pair of plies 37 and 38, the folded edge being slid between the projecting jaw portions 33 and 34, or 33' and 34', as the case may be, to position said member of fibrous sheet material between the jaws as shown in Fig. 5, so that the one jaw will lie on one side of the doubled sheet material member and the other jaw will lie on the other side thereof with two plies of said material between the jaws so that a garment can be placed with its edge between the two plies of fibrous material to interpose the plies of fibrous material between the metal of the jaws and the fabric of the garment. Due to the gripping means 31 provided, and the edge to edge engagement of the wire jaw members, such a fibrous protecting member and the garment will be securely clamped in position in depending relation to the cross bar 15 of the hanger. The fibrous material member illustrated in Fig. 5 is, preferably, made of heavy paper or cardboard, similar to that commonly used as protecting sheaths on wire coat hangers at the present time.

Instead of providing a member of a paper-like material that is of a temporary character, a protecting member can be placed in position between the jaws of the device, such as shown in Figs. 6 and 7, said member being made up of a plurality of plies 39 and 40 of a plastic sheet material bent or folded at 41 to provide a two ply insert that is slipped between the two jaws of the clip in the manner shown in Figs. 6 and 7, and which is held in position in assembled relation to the clip by suitable means interlocking with a jaw portion such as the outwardly struck or bent ear or lip 42 formed from the material of the protecting member and engageable in the substantially V-shaped recess 43 provided between the obliquely extending portion and one of the parallel portions of one of the jaw members so as to engage or hook over the obliquely extending portion 21 thereof, thus preventing any movement either lengthwise of the cross bar 15, or lengthwise of the jaw members by said protecting member, the same being thus securely held in position. It will be obvious that a garment can be engaged with the hanger provided with the protecting members of plastic sheet material shown in Figs. 6 and 7 by inserting the edge portion of the garment between the free edges of the plies 39 and 40, as indicated at 44, to place the garment in position on the hanger, the same being fully protected against any staining or damage by means of the jaws by said protective insert.

It will be noted that the cross bar portion 15 does not have any portions of the clip projecting above the upper edge thereof and thus, if desired, a garment such as a pair of trousers, can be hung across the cross bar in the usual manner, either while the clip members 18 and 19 are in use, or alternative to said clip members 18 and 19.

What I claim is:

1. A garment hanger having a body portion having clips depending therefrom in fixed position, said clips having pairs of opposed jaws having a normal tendency to engage with each other and a member of flexible sheet material folded to provide a plurality of plies clamped between said jaws, said plies being separable at the lower edge of said member for insertion of a garment therebetween.

2. A wire garment hanger having a substantially triangular body portion having a single cross bar, and wire clips depending from said cross bar in fixed position all portions of said clips lying below said cross bar, each of said clips comprising a pair of endless wire jaws integral with said cross bar and having gripping portions in transverse alignment with each other, said clips including clips near the ends of said cross bar and a central clip wider than said end clips.

3. A garment hanger having a body portion having clips depending therefrom in fixed position, said clips having pairs of opposed jaws having arms meeting in an acute angled bend and a detachable member of doubled sheet material clamped between said jaws, said sheet material member being folded along its top edge and having a projection thereon engaging in the acute angled bend of one of said jaws to hold said member of sheet material against displacement relative to said clip.

4. A garment hanger having a substantially triangular body portion having a cross bar and clips each comprising a pair of opposed jaws integral with and depending from said cross bar, said clips being in fixed position on said cross bar and including a clip mid-way of said cross bar, all portions of said clips lying below said cross bar, said clips having upper transverse end portions in alignment with said cross bar.

5. A garment hanger having a body portion having clips depending therefrom in fixed position, said clips having pairs of opposed jaws having a normal tendency to engage with each other and a doubled member of sheet material clamped between said jaws, said member being folded along its top edge to provide a pair of plies separable at the lower edge of said member and receiving the garment therebetween, said sheet material member and one of said jaws having interengaging means thereon for holding said member of sheet material against displacement relative to said jaws.

6. A wire garment hanger having a substantially triangular body portion having a single cross bar, and wire clips depending from said cross bar in fixed position, all portions of said clips lying below the top of said cross bar, each of said clips comprising a pair of endless wire jaws integral with said cross bar and having gripping portions in transverse alignment with each other, and connecting portions aligning with said cross bar to provide a continuous straight garment supporting surface on said cross bar from end to end thereof above said clips.

7. A wire garment hanger having a substantially triangular body portion having a single cross bar providing a horizontal garment support, and wire clips depending from said cross bar in fixed position, all portions of said clips lying below the top of said cross bar, each of said clips comprising a pair of endless wire jaws integral with said cross bar and having gripping portions in transverse alignment with each other, each of said jaws having serrations on the opposite faces of the gripping portions thereof.

ROBERT L. ROBERTSON.

REFERENCES CITED

The following references are of record in the file of this patent:

UNITED STATES PATENTS

| Number | Name | Date |
|---|---|---|
| 863,100 | Scholl | Aug. 13, 1907 |
| 1,605,918 | Buchanan | Nov. 9, 1926 |
| 1,989,953 | Tibbals | Feb. 5, 1935 |
| 2,014,165 | Beutler | Sept. 10, 1935 |
| 2,145,120 | Loveless | Jan. 24, 1939 |
| 2,421,307 | Albrecht | May 27, 1947 |